US005746491A

United States Patent [19]

Tatsukawa

[11] Patent Number: 5,746,491

[45] Date of Patent: May 5, 1998

[54] HEAD LAMP FOR VEHICLES

[75] Inventor: Masashi Tatsukawa, Shimizu, Japan

[73] Assignee: Koito Manufacturing Co., Ltd., Tokyo, Japan

[21] Appl. No.: 758,943

[22] Filed: Dec. 3, 1996

[30] Foreign Application Priority Data

Dec. 8, 1995 [JP] Japan .................................... 7-345535

[51] Int. Cl.$^6$ ........................................ B60Q 1/00

[52] U.S. Cl. .............................. 362/61; 362/310; 362/311

[58] Field of Search .............................. 362/61, 310, 311

[56] References Cited

U.S. PATENT DOCUMENTS

| | | | |
|---|---|---|---|
| 1,208,456 | 12/1916 | Bell | 362/61 |
| 2,012,806 | 8/1935 | Brown et al. | 362/61 |
| 2,294,007 | 8/1942 | Trauther | 362/61 |
| 2,347,055 | 4/1944 | Johnson | 362/61 |

*Primary Examiner*—Carroll B. Dority
*Attorney, Agent, or Firm*—Koda & Androlia

[57] ABSTRACT

A vehicle head lamp in which an outer cover is provided in front of a light-distribution control unit, and substantially horizontally extending decorative lines are formed by glare-reducing steps on the inner surface of the outer cover.

10 Claims, 5 Drawing Sheets

HEAD LAMP FOR VEHICLES

The present invention relates to a head lamp for a vehicle, and more particularly to the structure of a transparent cover for the head lamp.

In general, in vehicle head lamps, a desired light distribution pattern is formed by controlling light beams emitted from the bulb by the reflector and lens of the head lamp. In some head lamps recently developed and practically used, a desired light distribution pattern is formed using only the reflector, not using the lens.

In order to shape the surface of the head lamp so that it is flush with the car body, a transparent cover not having a light distributing function is frequently located in front of a light-distribution unit, which is composed of a bulb, a reflector mirror and a lens. In order to conform the better with the design of cars, substantially horizontally extending decorative lines are formed on the inner surface of the transparent cover. These decorative lines, have been formed by ribs on the inner surface of the transparent cover 2, as shown at 6*a* in FIG. 6 of the accompanying drawings.

The head lamp having the transparent cover with the decorative lines formed by ribs thereon has the following problems.

When minutely observing the ribs 2*a*, each of the ribs functions as a convex lens as shown in FIG. 7. A beam of light, which comes from the light-distribution control unit and is incident on the lower part of the rib 2*a*, is directed upwards and forwards of the head lamp. The light beams emanating from the ribs 2*a* thus provides glare to the drivers of oncoming cars and oncoming pedestrians.

The ribs may be trapezoidal or square in cross section as shown in FIGS. 8(*a*) and 8(*b*). Also in these cases, the light beam coming from the light-distribution control unit is directed forwardly and upwardly of the head lamp. This is caused by the lower face of the rib. In the case of FIG. 8(*a*), a light beam incident on the lower face of the trapezoidal rib 2*a* is refracted upwards. In the case of FIG. 8(*b*), a light beam incident on the rear face of the square rib 2*a*' is reflected on the lower inner surface of the rib 2*a*' and directed upwards.

For the above background reasons, the present invention has been made and has the object of providing a vehicle head lamp in which substantially horizontally extending decorative lines may be formed on the inner surface of the transparent cover of the head lamp without giving rise to upward light beams that will cause glare.

To achieve the above object, decorative line-forming unique steps are formed on the inner surface of a transparent cover.

According to the present invention, a vehicle head lamp in which a transparent cover is provided in front of a light-distribution control unit, and a substantially horizontally extending decorative line is formed on the inner surface of the transparent cover; is characterised in that the decorative line is defined by a step formed on the inner surface of the transparent cover such that the transparent cover immediately below the step is thicker than immediately above the step.

As used herein, the term "light-distribution control unit" means an assembly of lamp components having light distributing functions in the head lamp. The light-distribution control unit is usually formed with a bulb, a reflector and a lens. In this case, the "transparent cover" indicates an outer lens. In case where the reflector has the light distributing function of the lens, the "transparent cover" means a transparent cover having no function of lens.

A single "decorative line" may be used. If required, a plural number of "decorative lines" spaced above one above the other may be used.

Thus, in the present invention, the substantially horizontally extending decorative line formed on the inner surface of the transparent cover located in front of the light-distribution control unit is formed by the step formed on the inner surface of the transparent cover such that the section of the transparent cover below the step is thicker than the section above the step. The invention thus uniquely operates in the following manner and has the following useful effects. A light beam that leaves the light-distribution control unit is incident on the step where it is refracted downwards and advances in the transparent cover. It is further refracted downwards at the outer surface of the transparent cover. The light beam thus refracted downwards emanates from the transparent cover. Accordingly, there is no chance that the light beam is directed upwards at the decorative line. Accordingly, there is no chance that upward light beams are projected in front of the car. Accordingly, the head lamp of the invention will not give flare to the approaching pedestrians and the drivers of approaching cars.

The thickness of the transparent cover may be substantially uniform over each section of the cover separated by the step. If so done, the decorative line may be formed without any adverse effect on the distribution pattern formed by the light-distribution control unit. In this case, the thickness of the outer cover is not uniform over its entire height. Alternatively, the thickness of the transparent cover may be gradually reduced from the upper part to the lower part of each section of the cover separated by the step. If so done, the thickness of the outer cover 12 is generally uniform over its entire length. In this case, the light beam is directed slightly upwards when leaving each area of the transparent cover. Accordingly, it is desirable to tilt downwards the optical axis of the light-distribution control unit by a corresponding angle.

In case where the step is formed such that the part of the transparent cover below the step is thicker than a segment thereof defined by the part above the step, it is preferable to form the step so as to extend substantially perpendicular to the outer surface of the transparent cover. If an angle of the step with respect to the outer surface of the transparent cover above is an acute angle greatly different from a right angle, the molding quality of the transparent cover is degraded. If it is an obtuse angle greatly different from a right angle, the decorative line is indistinct. Accordingly, the angle of the step to the outer surface of the transparent cover is preferably substantially 90°, i.e. within the range 80° to 100°.

The height of the "step" is not limited in particular. However, if the height is too low, the decorative line is indistinct, while if it is, too high, the molding quality of the transparent cover is degraded, and the height of the step is preferably within the range of 0.1 to 0.5 mm.

Figure 1:
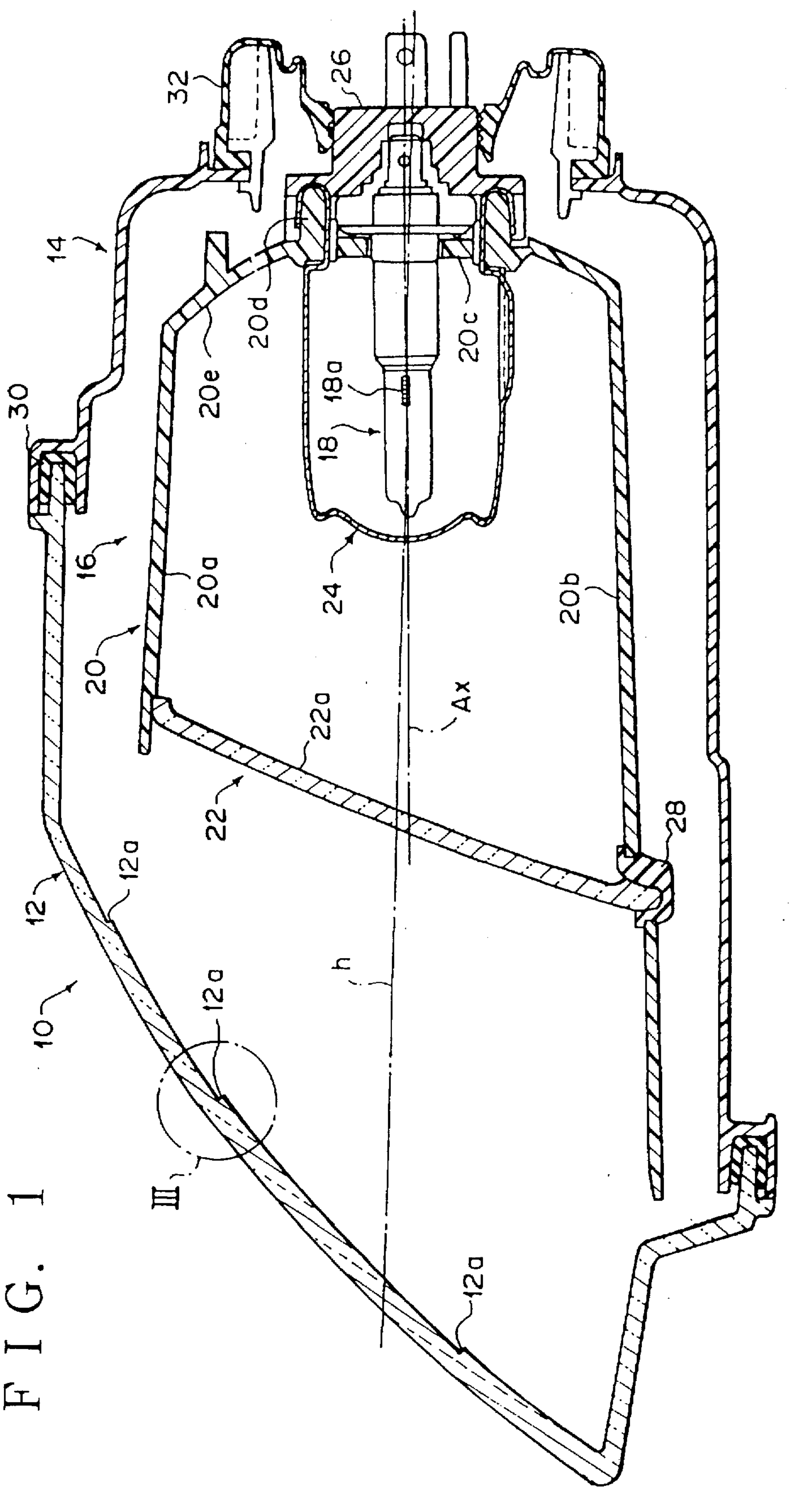
FIG. 1 is a vertical section showing a vehicle head lamp according to an embodiment of the present invention.

FIG. 1 shows a head lamp 10 of the so called four-lamp type. A light-distribution control unit for a main lamp and another light-distribution control unit for a sub-lamp are disposed in a lamp chamber, which is defined by a transparent cover 12 and a body 14. The light-distribution control unit for a sub-lamp, designated by numeral 16, is formed with a bulb 18, a reflector 20, an inner lens 22, and a shade 24. Provision is made for tilting the relevant parts of the lamp for aiming, in conventional manner.

The bulb 18 is an H1 bulb with a called C-8 type single filament 18a. An adaptor 26 is mounted on the bulb 18.

The reflector 20 is made of FRP, which has an upper wall 20a and a lower wall 20b. A bulb mounting seat 20c and a shade mounting part 20d are provided in the rear portion of the reflector 20. A bushing 28 is mounted on the lower wall 20b.

The inner lens 22, made of glass, is obliquely supported by the reflector 20 such that the front surface of the inner lens 22 faces slightly upwards. More exactly, the lower end of the inner lens 22 is fitted to the bushing 28 of the lower wall 20b of the reflector 20, while the upper end thereof is supported by the inner surface of the upper wall 20a of the reflector 20. A plural number of lens steps 22a, which are formed on the inner surface of the inner lens 22, control the distribution of light beams, which are emitted from the bulb 18 and reflected by a reflecting surface 20e of the reflector 20, so as to form a light distribution pattern (indicated by a solid line in FIG. 5) P of the head lamp 10.

A shade 24 for cutting off undesired light in forming the light distribution pattern is fixed to the shade mounting part 20d of the reflecting mirror 20.

Figure 5:
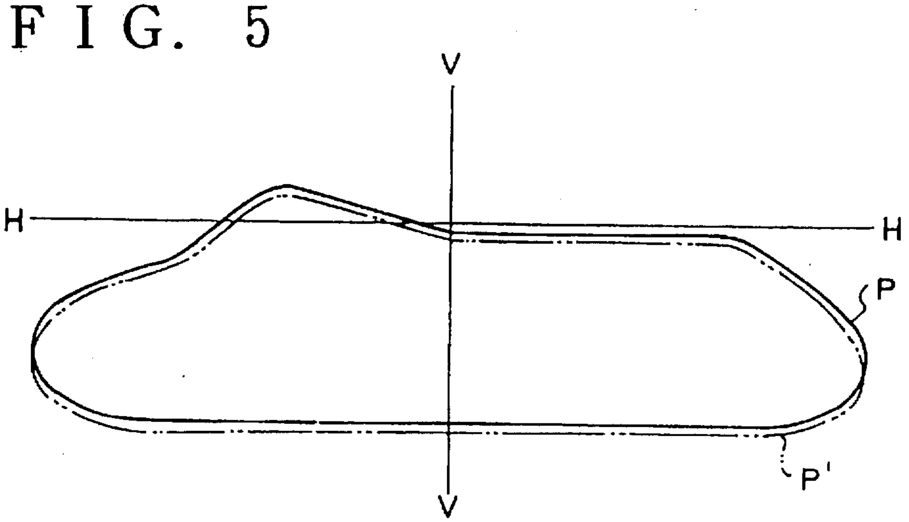
FIG. 5 is a diagram showing light distribution patterns useful in explaining the operation of the modification of FIGS. 3 and 4.
Figure 6:
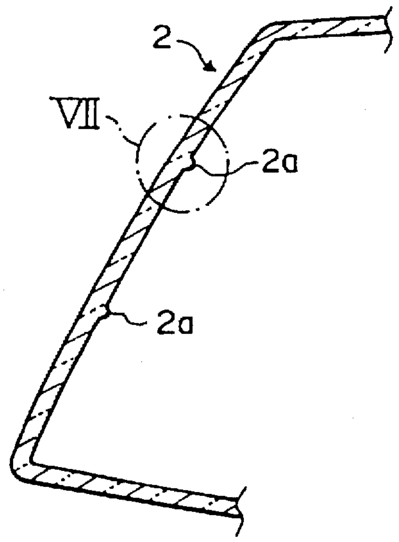
FIG. 6 is a cross sectional view showing a key portion of a transparent cover of a conventional head lamp.
Figure 7:
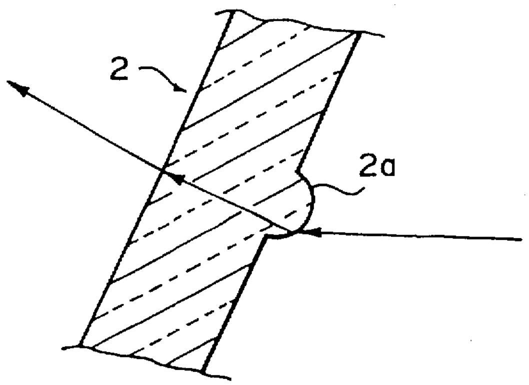
FIG. 7 is an enlarged sectional view showing a portion VII in FIG. 6.
Figure 8A:
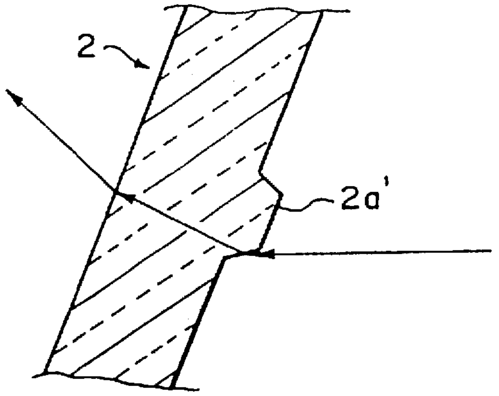
FIGS. 8a and 8b are enlarged sectional views showing other decorative line-forming ribs on the transparent cover of a conventional head lamp.
Figure 8B:
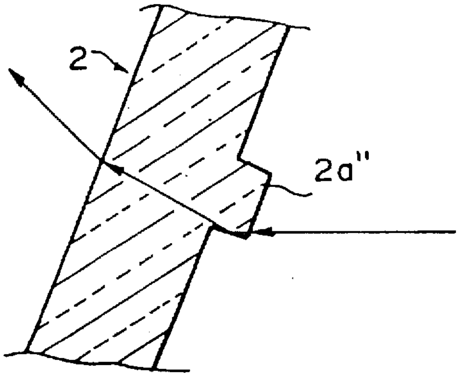

An optical axis Ax of the light-distribution control unit 16 is tilted slightly downwards with respect to a longitudinally extending, horizontal axial line h, so as to position the formed light distribution pattern P as shown in FIG. 5.

Figure 2:
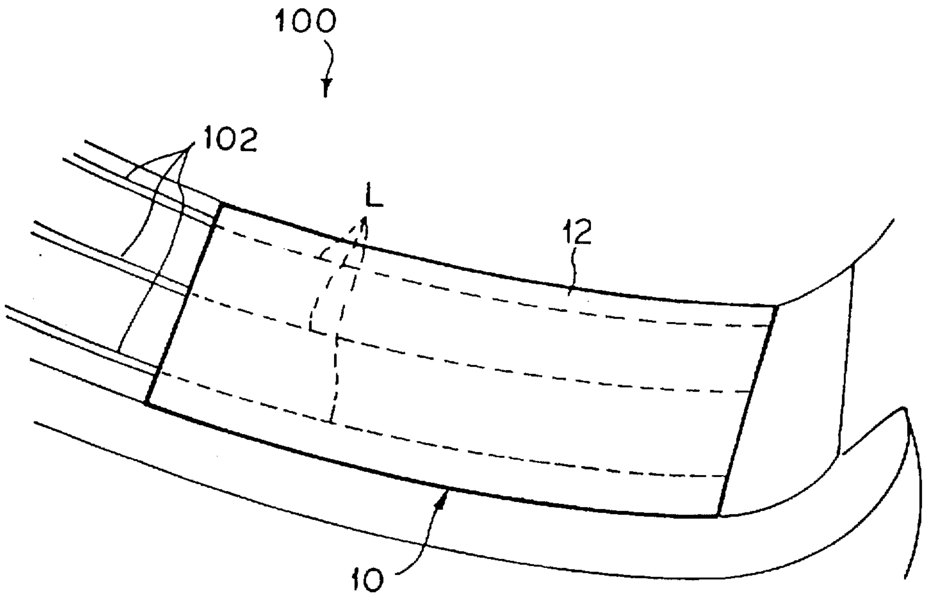
FIG. 2 is a perspective view showing the head lamp mounted on a car body.
Figure 3:
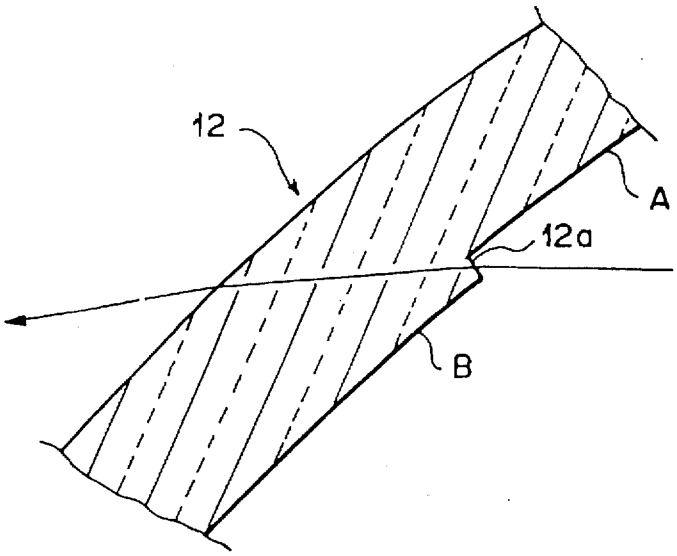
FIG. 3 is a vertical section through the lamp cover of a lamp which is a modification of that of FIG. 1.

The outer cover 12 is located in front of the light-distribution control unit 16. The outer cover 12 is a lens made of polycarbonate, disposed greatly inclined with its outer surface facing upwards. The pattern-draw direction of its molding is coincident with the horizontal axial line h. Three steps 12a are formed on the inner surface of the outer cover 12, vertically and separately arranged when viewed in cross section. These steps 12a extend substantially horizontally to form three decorative lines L, which are continuous to bars 102 of the front grille of the car (FIG. 2).

Figure 4:
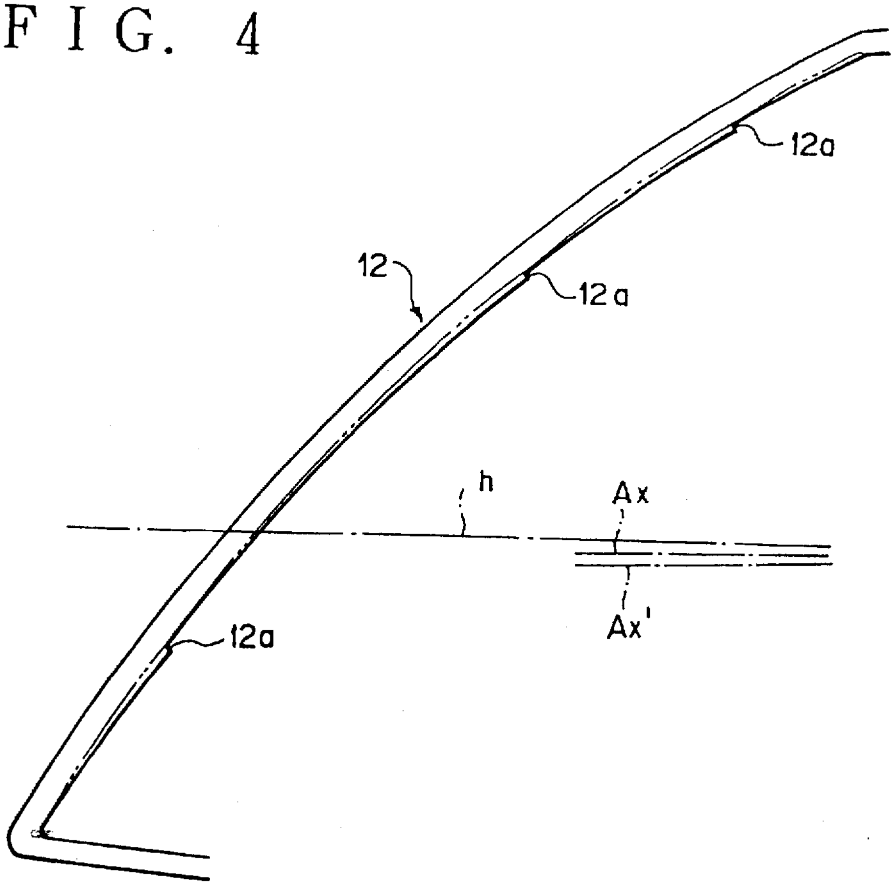
FIG. 4 is an enlargement of part of FIG. 3.

One step 12a is typically illustrated in detail in FIG. 4. As shown, an upper section A extending upwardly from the step 12a of the outer cover 12 is thinner than a lower section B. The step 12a extends substantially perpendicular to the outer surface of the outer cover 12. The height of the step 12a is approximately 0.3 mm.

As illustrated in FIG. 1, the outer cover 12 is mounted on the body 14 by means of sealing means 30 intervening therebetween. A socket 32 is mounted on the rear part of the body 14 and the adaptor 26.

The operation of the head lamp thus constructed will now be described.

As shown in FIG. 1, a light beam leaving the light-distribution control unit 16 is incident on each of the steps 12a on the inner surface of the outer cover 12. The light beam is refracted downwards at the step 12a and advances within the outer cover 12. The light beam is further refracted downwards when leaving the outer surface of the outer cover 12. Accordingly, there is no chance that the light beam is directed upwards at the decorative lines. In other words, the head lamp 10 will not provide glare to the drivers of oncoming cars and oncoming pedestrians.

Thus, according to the present invention, the decorative lines L may be substantially horizontally formed on the inner surface of the outer cover 12 without giving rise to any glare causing upwardly directed light beams.

It is noted that the step 12a extends substantially perpendicular to the outer surface of the outer cover 12. With this feature, the decorative lines L can clearly be formed while securing a good molding quality of the outer cover 12. With the step height of approximately 0.3 mm high, the decorative lines L are distinctly presented and a good molding quality of the cover 12 is ensured.

In the head lamp 10 of the present embodiment, each of the sections of the outer cover 12 separated by the steps 12a is substantially uniform in thickness. Accordingly, the decorative lines L may be formed not having any adverse effect on the pattern formed by the light-distribution control unit 16. The outer cover 12 stepwise increases its thickness at each step from the upper end to the lower end. Accordingly, the thickness of the outer cover 12 is not uniform over its entire length. There is thus still some room for improvement of the molding quality.

The outer cover 12 may be modified as the outer cover 12' as illustrated in FIG. 4. Here, each section of the outer cover 12' gradually reduces in thickness from the upper end to the lower end. With such a contour of the outer cover 12, the thickness of the outer cover 12 may be made substantially uniform over its entire length. Prisms having a refracting capability, although weak, to turn a light beam upwards are thus formed on the outer cover 12'. Accordingly, the light beam is directed slightly upwards when leaving such section of the outer cover 12. This problem may readily be solved by tilting downwards the optical axis of the light-distribution control unit 16 by an angle corresponding to the upward tilt of the light beam caused by the outer cover 12', as indicated by a line Ax'. As shown in FIG. 5, a light distribution pattern P formed by the light-distribution control unit 16 is slightly shifted upward by the outer cover 12', so that it coincides with the required light distribution pattern P.

What is claimed is:

1. A vehicular lamp comprising:
   a light-distribution control unit having an optical axis;
   a transparent cover disposed in front of said light-distribution control unit and inclined with respect to said optical axis and with an outer surface of said transparent cover facing upwardly;
   one or more substantially horizontally extending decorative lines formed on an inner surface of said transparent cover; and
   one or more steps formed on the inner surface of said transparent cover, said decorative line being formed by a step such that said transparent cover immediately below said step is thicker than immediately above said step, said step being of uniform thickness between any steps and of a different thickness on opposite sides of a step.

2. A head lamp comprising:
   a light-distribution control unit;
   a transparent cover disposed in front of said light-distribution control unit;
   a substantially horizontally extending decorative line formed on an inner surface of said transparent cover; and a step formed on the inner surface of said transparent cover, said step defining said decorative line such that said transparent cover immediately below said step is thicker than immediately above said step; and wherein the thickness of said transparent cover is substantially uniform over each section of said cover separated by said step.

3. A head lamp according to claim 1, wherein the thickness of said transparent cover is gradually reduced from an upper part to a lower part of each section of said cover separated by said step.

4. A head lamp according to any one of the preceding claims, wherein said step extends substantially perpendicular to an outer surface of said cover.

5. A head lamp according to claim 2, wherein the height of said step is within a range of 0.1 to 0.5 mm.

6. A head lamp according to claim 2, wherein a plural number of decorative lines each defined by one of said steps are spaced apart above one another on the inner surface of said transparent cover.

7. A head lamp according to claim 4, wherein the height of said step is within a range of 0.1 to 0.5 mm.

8. A head lamp according to claim 4, wherein a plural number of decorative lines each defined by one of said steps are spaced apart above one another on the inner surface of said transparent cover.

9. A head lamp according to claim 5, wherein a plural number of decorative lines each defined by one of said steps are spaced apart above one another on the inner surface of said transparent cover.

10. A head lamp according to claim 7, wherein a plural number of decorative lines each defined by one of said steps are spaced apart above one another on the inner surface of said transparent cover.

* * * * *